(12) United States Patent
Nyvad et al.

(10) Patent No.: US 10,125,745 B2
(45) Date of Patent: Nov. 13, 2018

(54) NACELLE CONSTRUCTION FOR A WIND TURBINE

(71) Applicant: MHI Vestas Offshore Wind A/S, Århus (DK)

(72) Inventors: Jesper Nyvad, Egå (DK); Michael Lundgaard Bitsch, Langa (DK); Mazyar Abolfazlian, Brabrand (DK); Morten Mogensen, Bramming (DK); Antonio Pizzuto, Morfelden-Waldorf (DE); Mads Damgaard, Lystrup (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 15/337,194

(22) Filed: Oct. 28, 2016

(65) Prior Publication Data
US 2017/0045038 A1    Feb. 16, 2017

Related U.S. Application Data

(62) Division of application No. 14/008,399, filed as application No. PCT/DK2012/050091 on Mar. 27, 2012, now Pat. No. 9,512,823.
(Continued)

(30) Foreign Application Priority Data

Apr. 6, 2011 (DK) .................. 2011 70162

(51) Int. Cl.
*F03D 80/60* (2016.01)
*F03D 80/80* (2016.01)
*F03D 1/04* (2006.01)

(52) U.S. Cl.
CPC ............... *F03D 80/60* (2016.05); *F03D 1/04* (2013.01); *F03D 80/80* (2016.05); *F03D 80/88* (2016.05);
(Continued)

(58) Field of Classification Search
CPC ...... F03D 1/003; F03D 80/00; F05B 2240/14; F05B 2240/80; F05B 2240/95;
(Continued)

(56) References Cited

U.S. PATENT DOCUMENTS 8,371,820 B2    2/2013  deBuhr et al.
9,670,898 B2 *  6/2017  Abolfazlian .............. F03D 9/25
(Continued)

FOREIGN PATENT DOCUMENTS

CN    201730767 U    2/2011
DE    20205396 U1   11/2002
(Continued)

OTHER PUBLICATIONS

International Searching Authority, Search Report and Written Opinion issued in corresponding International No. PCT/DK2012/050091, dated Jan. 15, 2013.
(Continued)

*Primary Examiner* — Matthew W Jellett
(74) *Attorney, Agent, or Firm* — Wood Herron & Evans LLP (57) ABSTRACT

A heli-hoist pad that is incorporated into a wind turbine nacelle in a manner that is optimized for helicopter approach and positioning of the heli-hoist pad, such as by being located within a recess in an upper surface of the wind turbine nacelle. Heat exchangers may also be positioned within the free flow of wind outside of a nacelle in manners that provide for serviceability while also allowing for optimal positioning of a heli-hoist pad.

8 Claims, 5 Drawing Sheets

Related U.S. Application Data (60) Provisional application No. 61/469,172, filed on Mar. 30, 2011.

(52) U.S. Cl.
CPC ..... *F05B 2240/14* (2013.01); *F05B 2240/916* (2013.01); *F05B 2260/20* (2013.01); *Y02E 10/722* (2013.01); *Y02E 10/726* (2013.01); *Y02E 10/728* (2013.01); *Y02T 50/675* (2013.01)

(58) Field of Classification Search
CPC .... F05B 2240/96; B64F 1/007; Y02E 10/726; H02K 5/20; H02K 9/28
USPC ......... 416/146 R, 244 R, 248; 182/112, 113, 182/129
See application file for complete search history.

(56) References Cited

U.S. PATENT DOCUMENTS

| | | | |
|---|---|---|---|
| 2007/0200103 A1* | 8/2007 | Viladomiu i Guarro | B66C 23/207 254/334 |
| 2010/0021278 A1* | 1/2010 | Stegemann | B66C 23/06 414/629 |
| 2012/0152651 A1 | 6/2012 | Jensen et al. | |
| 2013/0236308 A1 | 9/2013 | Tietze et al. | |
| 2013/0315735 A1 | 11/2013 | Arndt et al. | |

FOREIGN PATENT DOCUMENTS

| | | |
|---|---|---|
| EP | 1134410 A1 | 9/2001 |
| EP | 2469071 A1 | 6/2012 |
| EP | 2469074 A1 | 6/2012 |
| EP | 2505541 A1 | 10/2012 |
| WO | 2009132671 A2 | 11/2009 |
| WO | 2010026114 A2 | 3/2010 |
| WO | 2010085961 A2 | 8/2010 |

OTHER PUBLICATIONS

Danish Patent Office, Combined search and examination report issued in corresponding DK application No. PA 2011 70162 dated Nov. 22, 2011.
European Patent Office, Partial European Search Report in EP Application No. 16164721, dated Oct. 26, 2016.
European Patent Office, European Examination Report in EP Application No. 16164721, dated Mar. 28, 2018.

* cited by examiner

NACELLE CONSTRUCTION FOR A WIND TURBINE

CROSS REFERENCE TO RELATED APPLICATIONS

This application is a divisional of U.S. patent application Ser. No. 14/008,399, filed Mar. 7, 2014 (pending), which is a U.S. National Phase application of International Application No. PCT/DK2012/050091, filed Mar. 27, 2012 (expired), which designates the United States and claims priority to Danish Patent Application No. PA 201170162, filed Apr. 6, 2011. PCT/DK2012/050091 also claims priority from U.S. Provisional Application No. 61/469,172, filed Mar. 30, 2011 (expired). Each of these applications is incorporated by reference herein in their entirety.

FIELD

The field is that of wind turbines and more particularly nacelle constructions for wind turbines.

RELATED ART

Wind turbines are known to include heli-hoist pads for the transport of components and/or personnel to or from a helicopter. Heli-hoist pads, and the structures that support the heli-hoist pads, are often added to the wind turbine as an afterthought, subsequent to completing the design of the wind turbine nacelle. As a result, the nacelle structures that support the heli-hoist pad and the pad itself have are not optimized for load carrying capacity, weight, accessibility, and the like.

Various arrangements of heat exchangers have been used to remove heat from wind turbine drivetrain components and/or the interior of a wind turbine nacelle. Many existing systems use auxiliary fans to provide airflow through a heat exchanger, which can add cost and complexity to a system. Systems that do not use auxiliary fans typically position heat exchangers above the nacelle, which may pose issues for the approach of a helicopter to a heli-hoist pad and/or to the positioning of a heli-hoist pad.

SUMMARY

Aspects of the invention relate to a heli-hoist pad that is incorporated into a wind turbine nacelle in a manner that is optimized for helicopter approach and positioning of a heli-hoist pad. Aspects of the invention also relate to the positioning of and structure for supporting heat exchangers within the free flow of wind outside of a nacelle in manners that provide for serviceability of the heat exchangers while also allowing for optimal positioning of a heli-hoist pad.

According to one aspect of the invention, a nacelle construction of a wind turbine is disclosed that includes a nacelle supported by a tower. The nacelle rotatably supports a rotor of the wind turbine and houses at least one drivetrain component and has an upper surface. A heli-hoist pad, includes a platform and railing about at least a portion of the periphery of the platform. A recess in a first portion of the upper surface of the nacelle receives at least a portion of the platform such that the platform lies below a second portion of the upper surface of the nacelle that is outside of the recess.

According to another aspect, a nacelle construction of a wind turbine includes a nacelle supported by the tower. The nacelle rotatably supports a rotor of the wind turbine and houses at least one drivetrain component that generates heat when operated. The nacelle has a structure defined at least in part by a pair of lateral outer surfaces and an upper surface that each lie substantially parallel to the direction of wind flow when the wind turbine is in an operative position. At least one heat exchanger is positioned externally to the nacelle structure and is adapted to transfer heat from the at least one drivetrain component. A heat exchanger support structure extends laterally away from at least one of the lateral sides of the nacelle structure to position the at least one heat exchanger within wind flow passing.

BRIEF DESCRIPTION OF THE DRAWINGS

The accompanying drawings are not intended to be drawn to scale. In the drawings, each identical or nearly identical component that is illustrated in various figures may be represented by a like numeral or similar text. For purposes of clarity, not every component may be labeled in every drawing. In the drawings.

DETAILED DESCRIPTION OF THE FIGURES AND VARIOUS EMBODIMENTS

Figure 1:
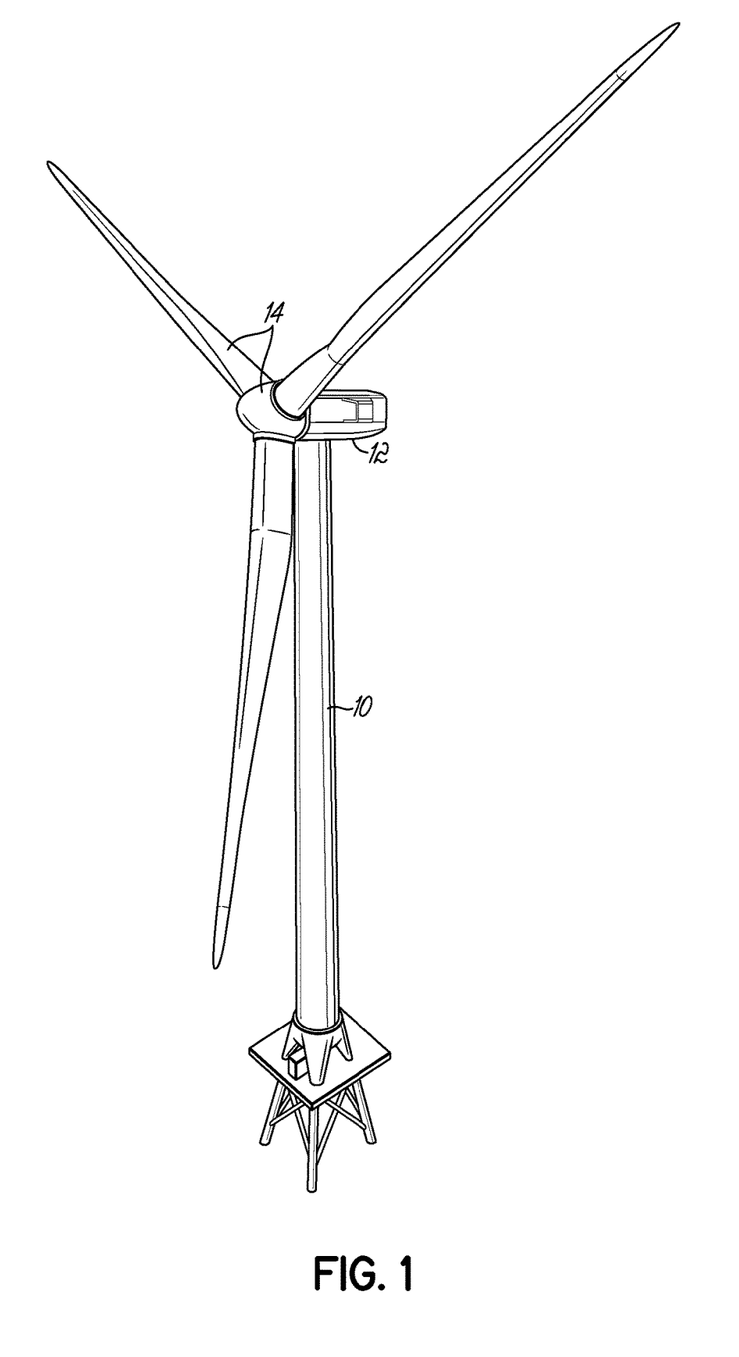
FIG. 1 is a perspective view of an offshore wind turbine.

Wind turbines, such as shown in FIG. 1, are typically constructed with a tower 10, a nacelle 12 supported on the tower, and a rotor 14 that is supported by the nacelle. In operation, the nacelle 12 is rotated or yawed about the tower 10 to face the rotor into the wind, so that that rotor 14 may be driven by the wind to harvest energy therefrom. The rotor 14 is mechanically coupled to one or more drivetrain components that may be housed within an interior of the nacelle, including one or more of a driveshaft, a gearbox, a coupling, a generator and/or a converter. These drivetrain components are used convert mechanical energy of the rotor into electrical energy to be delivered by the wind turbine.

One or more of the drivetrain components may, in operation, produce heat that may be removed to maintain the components and/or the interior of the nacelle within particular temperature ranges. Heat exchangers may be positioned within the free flow of wind that passes the nacelle during wind turbine operation to provide for efficient removal of such heat. According to various embodiments described herein, the heat-exchangers may be positioned and sized to optimize operation and serviceability, particularly for wind turbines with limited availability for heat exchangers to be positioned above the nacelle due to the presence of a heli-hoist pad.

A heli-hoist pad may be positioned at an upper portion of a nacelle to allow a helicopter to deliver personnel and/or components to the wind turbine. Heli-hoist pads may prove beneficial for servicing wind turbines, particularly when the wind turbine is located at a difficult to reach area, such as in offshore or mountainous locations, and/or when the nacelle is located at substantial heights above the ground or sea. As discussed in greater detail herein, the positioning and construction of the heli-hoist pad may be optimized both in terms of its positioning with respect to the nacelle and how the heli-hoist pad is supported by structure of the nacelle. According to some embodiments, an optimized solution may include the platform of the heli-hoist pad located at least partially in a recess on the upper surface of the nacelle.

Figure 2:
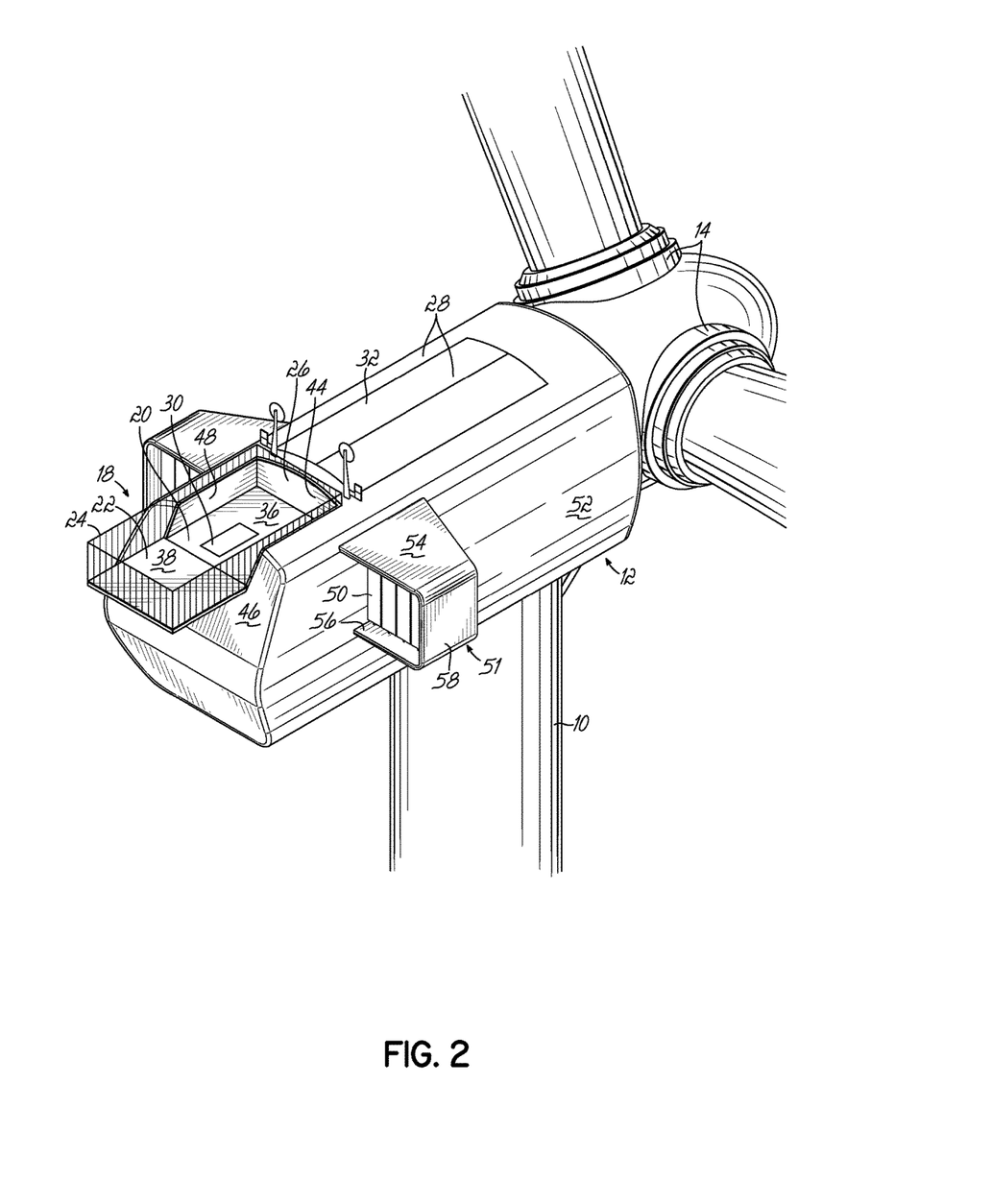
FIG. 2 is perspective view taken from an upper, downwind position of a wind turbine nacelle construction, showing a heli-hoist pad and heat exchanger support structures, according to one embodiment.

Turning now to the remaining figures, and initially FIG. 2, which shows a heli-hoist pad 18 positioned within a recess 20 in an upper surface 28 of a nacelle 12. The heli-hoist pad 18 includes a platform 22 and a railing 24. A first portion 36 of the platform is positioned within the recess and includes, about at least portions of three sides, a transition 26 between the recess 20 of the upper surface 28 and other portions of the upper surface 28. At other points about the periphery, the heli-hoist pad includes a railing 24, apex of which may be higher than the adjacent upper surface 28 of the nacelle 12. Also shown in FIG. 2 is a personnel door 30 and a service door 32. The personnel door 30 provides a passageway for personnel to move between the platform 22 and an interior space of the nacelle 12. The service door, positioned on the upper surface 28 of the nacelle, may be opened as shown in FIG. 2 to provide access into the interior of the nacelle for removal and/or replacement of drivetrain components and other equipment. FIG. 2 is a view of the embodiment of FIG. 1 (portions of the tower and rotor structure are omitted in FIG. 2) with both the personnel 30 and the service door 32 in open positions. Also shown in FIG. 2 is a nacelle based crane 74 that is extending partially out of the service door.

Figure 3:
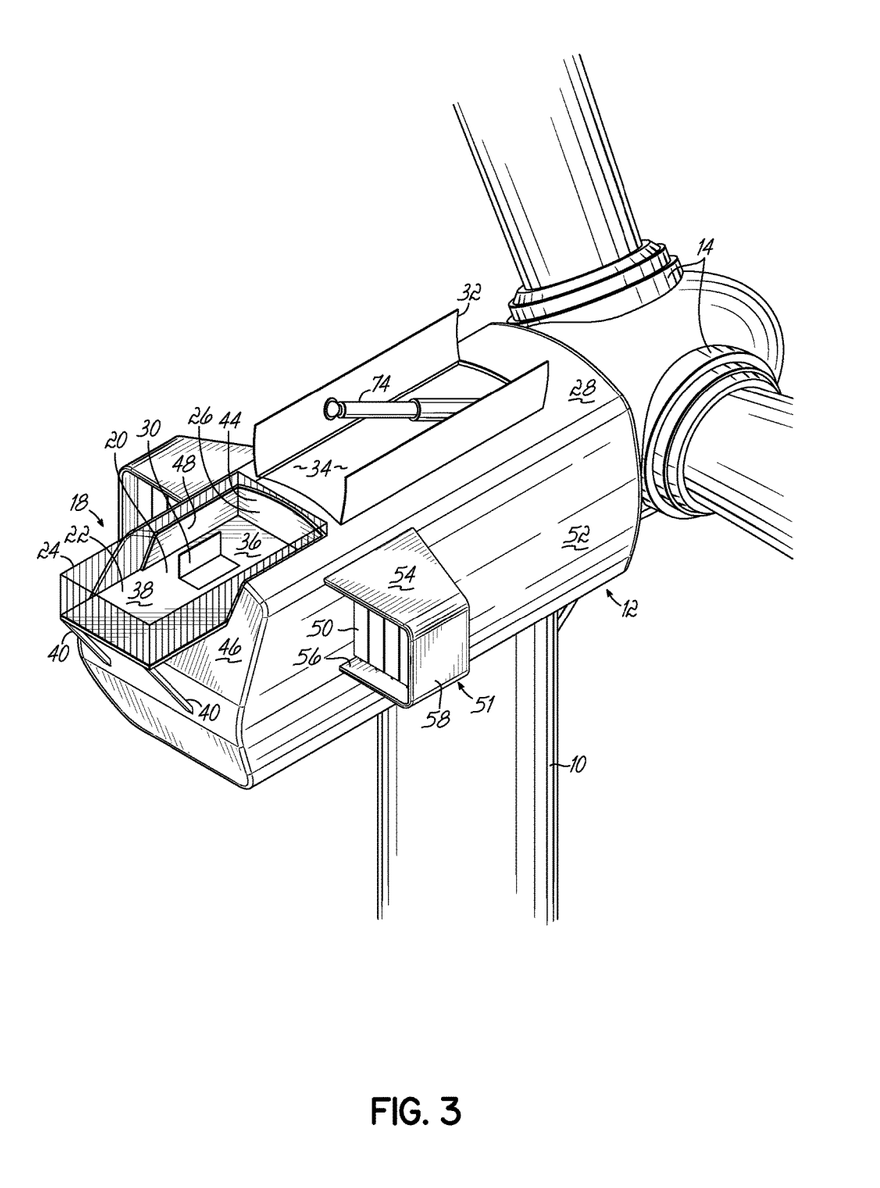
FIG. 3 is a perspective view of the embodiment of FIG. 2, showing an open personnel doorway into an interior of the nacelle from the heli-hoist pad and an open service door into an interior space of the nacelle.

Heli-hoist pads may be positioned to provide a favorable approach for a helicopter. As is to be appreciated, certain clearance should be maintained between the rotor of an approaching helicopter and the structure of the wind turbine, including the rotor of the wind turbine. To provide for clearance and/or to allow access for a wide range of helicopter sizes, the heli-hoist pad may be positioned toward the downwind side of the nacelle, or even partially extending from the downwind end 46 of the nacelle structure, as shown in FIGS. 2 and 3. In FIGS. 2 and 3, the heli-hoist pad 18 includes a first portion 36, positioned directly over the nacelle (i.e., the portion of the nacelle that defines an enclosure for other components and personnel) and a second portion 38 that extends away from the nacelle and which is supported by a frame 40 that connects to other structures of the wind turbine. According to one embodiment, the first portion has a length (taken in the downwind-to-upwind direction of the nacelle, when in the operative position) of up to or greater than 2.0 meters, up to or greater than 2.5 meters, up to or greater than 3.0 meters, or even greater. The second portion of the heli-hoist pad may have lengths ranging up to or greater than 2.0 meters, up to or greater than 2.5 meters, up to or greater than 3.0 meters, or even greater. Widths of the platform may range up to 2.0 meters or greater, up to or greater than 2.5 meters, up to or greater than 3.0 meters, or even greater.

Heli-hoist pads may be constructed to minimize impacts on the downdraft produced by the helicopter rotor and thus the helicopter itself. According to some embodiments, the railing 24 of the heli-hoist pad may be constructed to allow air flow from the helicopter downdraft to freely pass through therethrough, such as by being formed of vertical supports separated by air gaps, or the like. Additionally or alternatively, the platform 22 itself, or at least portions that do not lie directly over the nacelle, may be constructed of a grating that allows the passage of airflow therethrough. Positioning of the heli-hoist pad 18 either partially or wholly aft of the downwind end 46 of the nacelle may also help minimize the impact that the structure of the heli-hoist and the nacelle itself have on the helicopter downdraft.

The platform 22 of a heli-hoist pad 18 may be constructed to have a level and/or contiguous surface, even where the platform extends across multiple portions or includes a doorway, as in the embodiments of FIGS. 2 and 3. Providing a platform with a level surface may prove beneficial when personnel or items are lowered on the heli-hoist pad from above by eliminating obstacles or high spots that might otherwise need to be accommodated. The personnel door shown in FIGS. 2 and 3 lies flush with the platform surface when closed. It is to be appreciated that other arrangements are also possible, including embodiments that lack a personnel door directly on the platform.

The heli-hoist pad may be positioned to allow external access to equipment located inside of the nacelle. As mentioned herein, in the embodiments of FIGS. 2 and 3, the upper surface of the nacelle cover includes an openable service door 32 that provides access to the interior of the nacelle. As illustrated, the service door may be positioned just upwind of the heli-hoist pad and, in this respect, may provide a good vantage point for personnel overseeing activities within the nacelle. For instance, personnel may be provided with a good view of activities within the nacelle and/or on the heli-hoist pad when operating a nacelle based crane 74 used to move components, as shown in FIG. 3.

Figure 4:
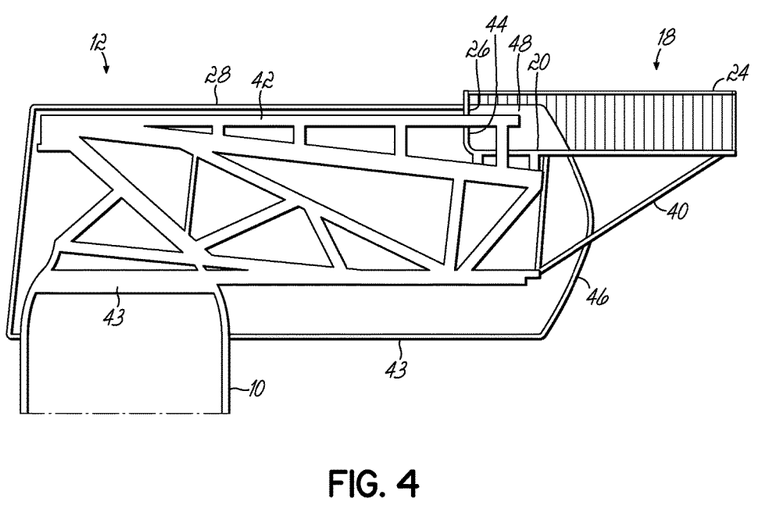
FIG. 4 is a cutaway view of a nacelle, showing support structures for a heli-hoist pad, according to one embodiment.

Broadly speaking, the design of the heli-hoist pad may be optimized to maximize the weight of the total load that may be supported by the platform while minimizing the weight of the structure dedicated to supporting the heli-hoist pad and the heli-hoist pad itself. As is to be appreciated, the outer surfaces of a nacelle structure are often supported by a nacelle "skeleton structure" 42 that is, in turn, supported by a base frame 43 (or other structure) that supports the entire nacelle on top of the tower 10. FIG. 4 is a partial cross-sectional view showing the skeleton structure that is supports the surfaces of the nacelle, and other internal support structures. According to one optimization, the heli-hoist pad is not supported, or at least is only supported minimally by portions of the skeleton structure 42 that support the upper surface 28 of the nacelle. Instead, the support structure, as shown in FIG. 4, is directly connected to internal structures of the nacelle. Supporting the heli-hoist pad in this manner may allow the skeleton structure that supports the upper surface of the nacelle to be lighter weight. Additionally, placement of the heli-hoist pad may be lower with respect to the upper surface of the nacelle, and actually within recess as shown, may help minimize the amount and weight of material used to support the heli-hoist pad.

Optimizing the capacity/weight of the heli-hoist pad may benefit from moving the platform lower with respect to other portions of the nacelle, as mentioned above. According to some embodiments, the upper surface of the nacelle may include a recess 20 to receive all or a portion of the platform of a heli-hoist pad to help achieve a lower platform position. As shown in FIGS. 2 and 3, the upper surface 28 of the nacelle includes a recess 20 that provides for level platform mounting of the heli-hoist pad 18. The recess, as shown, extends from a transition 26 at the upwind end 44 of the recess to the downwind end 46 of the nacelle, allowing a level platform to extend across and beyond the downwind end. The recess also includes transitions at lateral sides of the platform that allow at least portions of three sides of the platform to set within the recess. Upwind and lateral sides of the recess may, as shown, conform to the railing or other side structure of the heli-hoist pad. In some instances, railings or portions of the railing may be provided directly by the recess itself, rather than a separate structure.

The depth of the recess into the upper surface of the nacelle may vary, according to different embodiments. In the illustrative embodiment of FIGS. 2 and 3, the apex of the upper surface of the nacelle is over a meter higher than the platform of the heli-hoist pad. The platform of the heli-hoist pad, is in turn, approximately 1 meter higher than the supporting from within the interior of the nacelle, as shown in FIG. 4. It is to be appreciated that these distances are merely examples, and that other embodiments may include different recess depths, including depths of 0.25 meters, 0.5 meters, 1.5 meters, and other variations.

As may be appreciated, wind turbine nacelles typically house drivetrain components that produce heat when operated, such as gearboxes, generators, converters, transformers, and the like. The heat produced by these and/or other components may be removed through various mechanisms. In the embodiment of FIGS. 2 and 3, heat exchangers 50 are positioned on lateral surfaces 52 of the nacelle in the flow of wind that passes by the nacelle 12. Positioning the heat exchanger on one or more lateral sides of the nacelle may provide several benefits, as discussed in greater detail herein.

Positioning heat exchangers 50 externally to the nacelle 12 and in the free flow of wind that passes may provide sufficient air flow for heat removal under different operating conditions. As may be appreciated, the power generated by a wind turbine is proportional to the speed of the available wind. The amount of heat generated by drivetrain components is also, generally speaking, proportional to the amount of power that is being produced by the wind turbine, and thus also proportional to the speed of the available wind. Heat exchangers placed directly in the free flow of wind will reject greater amounts of heat when the wind is at greater speeds. In this respect, heat exchangers positioned in the free flow of wind may naturally act to reject more heat as power and heat generation increase along with available wind speeds. According to some embodiments constructed in this manner, such as the embodiments illustrated herein, the heat exchangers may operate without auxiliary fans to move air through the heat exchangers, thereby reducing the complexity and costs of the system.

Figure 5:
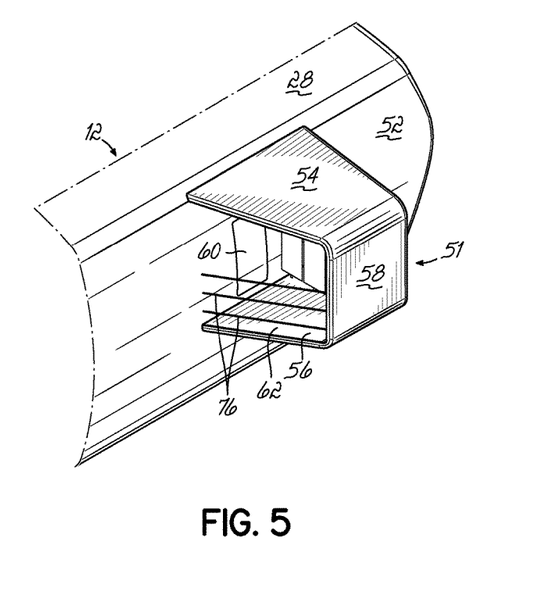
FIG. 5 is a partial perspective view a support structure positioned at a lateral surface of a nacelle to support heat exchangers, according to one embodiment.

FIG. 5 shows heat exchangers positioned outside a lateral surface of the nacelle of a wind turbine, according to one embodiment. As shown, a heat exchanger support structure 51 holds a bank of fin and tube heat exchangers 50 facing into the free flow of wind that passes parallel to the lateral surface of the nacelle, when in the operative position (i.e., with the rotor facing into the wind). The support structure 51 includes an upper support arm 54, a lower support arm 56, and a connecting support arm 58. Together, each of the lateral surface 52 of the nacelle 12, the upper support arm 54, the lower support arm 56, and the connecting support 58 arm define a passageway to receive the free flow of air. It is to be appreciated that the support structure shown in FIG. 5 is but one possible construction and that others are also contemplated.

Features may be included in the nacelle construction to allow access to the heat exchangers by service personnel. The illustrative embodiment of FIG. 5 includes a doorway 60 that provides access between the heat exchangers 50 and the interior of the nacelle. A service platform 62 is positioned just outside of the doorway 60 to provide a pathway for personnel to approach and work on the heat exchangers 50. The platform 62, according to some embodiments, may include railings 76 and/or attachment points for the installation of safety equipment, such as safety harnesses. The platform, or other features of the support structure, may also be constructed to allow heat exchangers to be lifted upwardly from outside of the nacelle. In this respect, cranes (nacelle based or otherwise) and/or helicopters may be used to lower or raise heat exchangers into position near the platform for service and/or replacement. According to one embodiment, a portion of the platform may not be directly underneath the upper support arm to provide a direct line upward for lowering or raising a heat exchanger.

The heat exchangers, positioned outside of the nacelle, may be shaped and/or sized to allow for maintenance. By way of example, each bank of heat exchangers may be constructed of modules that each weight less than 80 kilograms and that are each sized to fit through the doorway that leads into the nacelle interior, according to one embodiment. The height of the heat exchangers and/or the distance between the upper and lower support arm may be kept to less than 3.0 meters or even less to allow service personnel to reach both the upper and lower ends of the bank of heat exchangers without the use of a ladder. In this respect, such embodiments of heat exchangers may extend a height associated with only a single floor or level of the nacelle, despite the nacelle potentially having a height that is much greater and potentially having multiple floors located in the nacelle interior.

Figure 6:
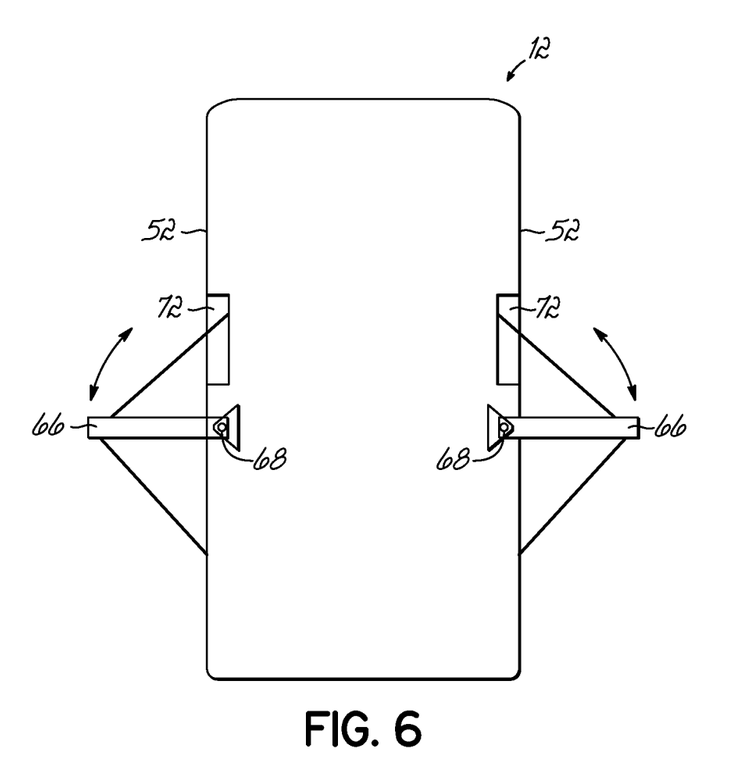
FIG. 6 is a schematic view of one embodiment of a heat exchanger support structure that is capable of moving heat exchangers toward a lateral side of a nacelle.

FIG. 6 illustrates an alternative embodiment for positioning heat exchangers near a lateral surface of a nacelle, and for providing access to the heat exchangers for service. As shown, the support structure includes support arms 66 that are connected to the nacelle structure 12 with a pivotal connection 68. The structures act to support the heat exchangers, much like the structure of FIG. 5, but access to and service of the heat exchangers may be accomplished by rotating the support structure about the pivotal connection 68 to bring the heat exchangers toward the lateral surface 52 of the nacelle, such as with cables that hold the support structure in position. According to some embodiments, the lateral surface of the nacelle may include a opening 72 that allows the support structure, including the heat exchangers, to enter the interior of the nacelle for service. According to other embodiments, the support arms may pivot to bring the heat exchangers next to an opening 72 at the lateral surface of the nacelle that allows personnel to reach out of the nacelle to access heat exchangers for service and/or replacement. It is to be appreciated that support structures may be constructed in other ways that move the heat exchangers toward the lateral side of the nacelle. For instance, according to some embodiments a sliding mechanism may be used to move the heat exchangers toward or into the interior of the nacelle.

According to yet another alternative embodiment, heat exchanges may be positioned by a support structure that extends upwardly of the upper surface of the nacelle. Somewhat like the pivotable support structures/heat exchangers in the embodiment of FIG. 6, the upwardly extending support structure may fold to move the heat exchanges from an operative position, where the heat exchangers are positioned substantially vertically in the free flow of wind, to a position where the heat exchangers and the support are not upwardly extending. According to some embodiments, the upwardly extending support may even be moved to a substantially horizontal position where such that the structure may act as a heli-hoist pad. A pivotal connection and cabling may be used to hold the support structure and move the structure between each of these positions, according to one embodiment.

The phraseology and terminology used herein is for the purpose of description and should not be regarded as limiting. The use of "including", "comprising", "having", "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of this description invention. Accordingly, the foregoing description is by way of example only, and is not intended as limiting. The invention(s) are limited only as defined by the following claims and the equivalents thereto.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. For example, although aspects of the invention are described above with reference to a fin and tube type of heat exchanger, aspects of the invention may be used with any type of heat exchanger, including various types of air-to-water heat exchangers, air-to-fluid heat exchangers, and different types of working fluids, including but not limited to water, glycol, oil, and the like. Thus, aspects of the invention are not intended to be construed narrowly in view of the illustrative embodiments. In addition, it should be understood that aspects of the invention may be used alone or in any suitable combination with other aspects of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A nacelle construction of a wind turbine, comprising:
  a nacelle supported by a tower, the nacelle rotatably supporting a rotor of the wind turbine and housing at least one drivetrain component that generates heat when operated, the nacelle having a structure defined at least in part by a pair of lateral outer surfaces and an upper surface that each lie substantially parallel to the direction of wind flow when the wind turbine is in an operative position;
  at least one heat exchanger positioned externally to the nacelle structure and adapted to transfer heat from the at least one drivetrain component;
  a heat exchanger support structure that extends laterally away from at least one of the lateral outer surfaces of the nacelle structure to position the at least one heat exchanger within wind flow passing the nacelle structure, wherein subsequent to coupling the heat exchanger support to the nacelle, the heat exchanger support is movable relative to one of the pair of lateral outer surfaces; and
  a nacelle based crane configured to access the at least one heat exchanger externally of the nacelle.

2. The nacelle construction of claim 1, further comprising:
  a doorway located on the at least one of the lateral outer surfaces of the nacelle structure near the heat exchanger to provide access to the heat exchanger.

3. The nacelle construction of claim 2, wherein the heat exchanger support structure includes a platform positioned outside of the doorway to accommodate service personnel.

4. The nacelle construction of claim 1, wherein the heat exchanger support structure includes a pair of heat exchanger support structures, one extending away from each of the lateral outer surfaces of the nacelle structure and each supporting at least one heat exchanger.

5. The nacelle construction of claim 1, wherein the upper surface of the nacelle structure includes a service door that, when opened, provide access to inside of the nacelle structure from above.

6. The nacelle construction of claim 1, further comprising:
  a heli-hoist pad positioned at the upper surface of the nacelle structure.

7. The nacelle construction of claim 1, wherein the heat exchanger support is movable toward one of the pair of lateral outer surfaces.

8. The nacelle construction of claim 1, wherein the heat exchanger support is movable relative to one of the pair of lateral outer surfaces by pivoting or lateral movement.

* * * * *